United States Patent [19]

Montagna et al.

[11] 4,057,488

[45] Nov. 8, 1977

[54] CATALYTIC POUR POINT REDUCTION OF PETROLEUM HYDROCARBON STOCKS

[75] Inventors: Angelo Anthony Montagna, Monroeville; Allen Evarts Somers; Stephen Luther Peake, both of Pittsburgh; Sun Woong Chun, Murrysville, all of Pa.

[73] Assignee: Gulf Research & Development Company, Pittsburgh, Pa.

[21] Appl. No.: 738,317

[22] Filed: Nov. 2, 1976

[51] Int. Cl.$^2$ ............................................... C10G 23/04
[52] U.S. Cl. ...................................................... 208/89
[58] Field of Search ........................... 208/210, 89, 111

[56] References Cited

U.S. PATENT DOCUMENTS

| | | | |
|---|---|---|---|
| 3,420,768 | 1/1969 | Bray et al. | 208/89 |
| 3,516,925 | 6/1970 | Lawrence et al. | 208/111 |
| 3,655,551 | 4/1972 | Hass et al. | 208/89 |
| 3,684,691 | 8/1972 | Arey et al. | 208/89 |
| 3,801,497 | 4/1974 | Benner | 208/89 |
| 3,968,028 | 7/1976 | Frayer et al. | 208/210 |

*Primary Examiner*—George Crasanakis

[57] ABSTRACT

The pour point reduction of petroleum hydrocarbon stocks is obtained by the process of reducing the nitrogen concentration of the petroleum hydrocarbon stock to an acceptable level and thereafter contacting the petroleum hydrocarbon stock in the presence of hydrogen with a catalyst comprising titanium and a Group VIII noble metal on a decationized crystalline mordenite support under pour point reduction conditions of temperature, pressure and space velocity.

6 Claims, No Drawings

CATALYTIC POUR POINT REDUCTION OF PETROLEUM HYDROCARBON STOCKS

BACKGROUND OF THE INVENTION

Conventionally the pour point reduction of petroleum hydrocarbon stocks has been accomplished by blending the high pour hydrocarbon with a low pour distillate by the addition of pour point depressants or by the low temperature solvent extraction of waxy components from the high pour hydrocarbon. The latter process is an expensive operation and is generally reserved for lube oil fractions.

Recently, British Petroleum has publicized the use of a catalytic process for dewaxing lube oils. The British Petroleum process, as described in U.S. Pat. No. 3,516,925, employs a dual-function shape-selective zeolite hydrocracking catalyst consisting of platinum on H-mordenite to selectively hydrocrack normal or near-normal paraffins.

Although catalytic dewaxing processes such as proposed by British Petroleum appeared to be attractive when compared to the relatively expensive low temperature solvent extraction processes presently being employed, the commercial feasibility of any catalytic dewaxing process can be established only after the process has been found to be generally applicable to conventional refining streams and only after the catalyst has been found to be commercially stable.

STATEMENT OF INVENTION

An improved pour point reduction process which comprises contacting a petroleum hydrocarbon fraction containing greater than 50 percent by volume of material boiling above 450° F. (232° C.) with a denitrogenation catalyst under denitrogenation conditions to obtain a product hydrocarbon containing less than 30 parts per million (ppm) nitrogen, and contacting the denitrogenation product hydrocarbon with a catalyst under pour point reduction conditions, the pour point reduction catalyst comprising titanium, a Group VIII noble metal, and a decationized crystalline mordenite support.

DESCRIPTION OF THE INVENTION

The invention is applicable to petroleum hydrocarbon stocks containing greater than 30 ppm nitrogen and having more than 50 percent by volume of materials boiling above 450° F. (232° C.) such as fuel oils, furnace oils, gas oils and lube oils. The lube oils are those distillate and deasphated lube oil fractions boiling in the range of 600° to 1,000° F.+(315.6° to 537.8° C.+).

The petroleum hydrocarbon feed is initially contacted with a denitrogenation catalyst in the presence of hydrogen and under denitrogenation conditions of temperature, pressure and space velocity so as to obtain a product containing less than 30 ppm nitrogen. Preferably, the denitrogenated product contains less than 25 ppm nitrogen, particularly with a lube oil feed to the denitrogenation step.

The catalyst employed in the denitrogenation process can comprise at least one hydrogenation component selected from Group VI-B and one hydrogenation component from Group VIII metals on a refractory oxide carrier in a form capable of promoting hydrogenation reactions. Especially effective catalysts are those containing nickel and tungsten on alumina. Other catalysts found to be effective include those containing nickel, cobalt, and molybdenum, nickel and molybdenum, and cobalt and molybdenum. The hydrogenating components of such catalysts can be employed in the sulfided or unsulfided form.

Although the hydrogenating components indicated above can be employed in any proportion with each other, especially effective catalysts are oxides or sulfides comprising (a) a combination of 5–25 percent by weight of a Group VI-B metal and (b) 5–20 percent by weight of one or more metals of Group VIII. The hydrogenating components can be composited with an inorganic refractory oxide support such as alumina or silica-alumina by methods known in the art. The catalyst composite as employed in the denitrogenation step can be shaped in the form of extrudates, granules, pellets, balls or the like.

The denitrogenation reaction can be conducted at a temperature in the range of 500° to 1,000° F. (260° to 538° C.), preferably, 550° to 800° F. (277° to 427° C.). The process is conducted by contacting the catalyst composite with the petroleum hydrocarbon feed in the presence of uncombined hydrogen partial pressures in the range of 200 to 4,000 psig (14.1 to 282 kg/cm$^2$). Hydrogen can be circulated through the reactor containing the catalyst bed at a rate between about 700 and 15,000 standard cubic feet per barrel of feed (12.4600 and 267.0 SCM/100 L) with the hydrogen purity of the circulating gaseous stream ranging from 60 to about 100 percent. The reaction can be continuously conducted at a liquid weight hourly space velocity in the range of 0.2 to 10. Reaction zone pressures in the range of 200 to 5,000 psig (14.1 to 353 kg/cm$^2$) are maintained in the denitrogenation zone.

The denitrogenated petroleum hydrocarbon is thereafter subjected to a pour point reduction process employing a catalyst comprising a Group IV-B metal, a Group VIII nobel metal, and a decationized crystalline mordenite support. The preferred Group IV-B metal is titanium and preferred Group VIII noble metals are platinum and palladium.

The crystaline mordenite should have pore openings at least 5 A in diameter, preferably 7 – 9 A in diameter, with the sodium cations having been replaced by hydrogen to obtain a "decationized" mordenite. The decationization treatment of the mordenite is conventionally obtained by exchanging the sodium form of the mordenite with ammonium cations. The ammonium form can then be heated to drive off ammonia leaving behind the hydrogen form or decationized mordenite. Preferably, the metal cation content of the decationized mordenite is reduced to an amount not exceeding 2.0 weight percent, more preferably, not exceeding 0.5 weight percent of the mordenite.

The noble metal hydrogenation component from Group VIII can be incorporated into the mordenite by impregnation or cation exchange. Ammonium or amine complexes of the noble metals can be used for exchanging in acidic solutions. The noble metals are employed in amounts of about 0.01 to 5.0 weight percent, preferably 0.1 to 2.0 weight percent of the catalyst composite.

The Group IV-B metal can be conveniently incorporated into the mordenite by impregnation from an aqueous solution of a salt of the Group IV-B metal. When employing titanium as the Group IV-B metal, for example, suitable titanium salts include titanium trichloride, titanium oxalate, and titanium tetrachloride. If titanium tetrachloride is employed, the aqueous carrier should contain a concentration of ammonia to maintain the titanium tetrachloride dispersed throughout the aqueous phase. The Group IV-B metal is added to the mordenite so as to obtain a concentration of the metal in the range of 0.1 to 10.0 weight percent, preferably 0.2 to 2.5 weight percent.

Following impregnation of the Group IV-B metal on the mordenite, the mordenite containing the Group VIII and Group IV-B metals can be subjected to conventional drying and calcination steps. The deposition of the Group IV-B metal on the support can precede or follow compositing of the Group VIII noble metal with the mordenite. The Group VIII noble metal and the Group IV-B metal can also be deposited simultaneously on the mordenite. Preferably, intermediate drying and calcining steps are employed in the sequential addition of the Group VIII and Group IV-B metals to the mordenite.

Preferably the hydrogenation metals of the pour point reduction catalyst compositions are employed in the sulfided form. The catalyst composition can be presulfided by treating the calcined catalyst with hydrogen sulfide or preferably a mixture of hydrogen and hydrogen sulfide at a temperature normally in the range of about 300° to 750° F (149° to 399° C.) or more and at a pressure ranging from atmospheric to 3,000 psig (211 kg/cm$^2$). When employing a mixture of hydrogen and hydrogen sulfide as a presulfiding gaseous mixture, the concentration of hydrogen sulfide will normally range from about 5 to about 20 percent by volume. Other conventional methods can be employed to presulfide the catalyst composite.

The pour point reduction catalyst is contacted with the feed containing less than 30 ppm nitrogen at a temperature in the range of 450° to 800° F. (232.2° to 426.7° C.) in the presence of hydrogen. Hydrogen partial pressures in the range of 500 to 5,000 psig (35.00 to 350 kg/cm$^2$) are employed in the pour point reduction zone and the hydrogen circulation rate through the zone is maintained in the range of 500 to 10,000 standard cubic feet per barrel of feed (8.9 to 178. SCM/100 L). A liquid hourly space velocity in the range of 0.2 to 10.0 is maintained in the pour point reduction zone.

With the petroleum hydrocarbon feed to the denitrogenation zone comprising a fuel oil, furnace oil, or light gas oil [boiling in the range of 330° to 775° F. (165.6° to 412.8° C.)] the pour point reduction process step is preferably conducted so as to convert less than 30 volume percent of the feed to a product fraction boiling below the boiling range of the feed. With the petroleum hydrocarbon feed comprising a heavy gas oil [boiling in the range of 650° to 950° F. (343.3° to 510° C.)] or a lube oil, the pour point reduction process step is preferably conducted so as to convert less than 35 volume percent of the feed to a product fraction boiling below the boiling range of the feed to the pour point reduction zone.

By employing the two-step pour point reduction process described above, the pour points of fuel oils, furnace oil, gas oil, and lube oils can be substantially reduced while employing a catalyst which is commercially stable. The pour point reduction catalyst can be regenerated employing a conventional air burn-off regeneration procedure.

In order to illustrate our invention, the following examples are presented although it is not intended that the invention should be limited to the specific embodiments presented therein.

EXAMPLE I

In this Example the effectiveness of the inventive process to reduce the pour point of a petroleum distillate obtained from a Cabinda crude oil is demonstrated. The petroleum distillate having a boiling range from 330° to 700° F. (165.6° to 371.1° C.) was passed through a denitrogenation zone containing a catalyst comprising 6.0 weight percent nickel and 19.0 weight percent tungsten on alumina. A denitrogenation hydrogen pressure in the range of 1,000 to 1,500 psig (70 to 105 kg/cm$^2$) and a temperature in the range of 700° to 750° F. (371.1° to 398.9° C.) was maintained in the denitrogenation zone.

The petroleum distillate was passed through the denitrogenation zone at the rate of 1.25 to 1.50 volumes per volume of catalyst per hour to reduce the nitrogen content of the petroleum distillate to less than 1 ppm. The nitrogen content of the feed to the denitrogenation zone was in excess of 150 ppm. The product of the denitrogenation process step was further characterized as follows:

TABLE I

| | |
|---|---|
| Gravity: ° API | 42.1 |
| Pour Point: ° F. | +25 (−3.89° C) |
| Hydrocarbon Type, ASTM D 1319: Vol % | |
| Aromatics | 13.5 |
| Olefins | 0.5 |
| Saturates | 86.0 |
| Distillation: ° F (ASTM D 86) | |
| Overpoint | 347 |
| 5% | 385 |
| 10 | 406 |
| 20 | 431 |
| End Point | 645 |

In the pour point reduction step a catalyst comprising 0.5 weight percent titanium and 1.0 weight percent palladium on H-mordenite (Norton Type 900 H Zeolon was employed). The catalyst was prepared by impregnating the H-mordenite support with a titanium trichloride aqueous solution followed by the contact of the impregnated support with Pd(NH$_3$)$_4$(NO$_3$)$_2$. The catalyst was prereduced in flowing hydrogen at one atmosphere by raising the temperature at a 100° F. (56° C.) per hour rate until a temperature of 850° F. (454.4° C.) as reached, maintaining the catalyst at that temperature for one hour in a hydrogen atmosphere.

The pour point reduction process conditions employed in this Example were a hydrogen partial pressure of 1,000 psig (70 kg/cm$^2$), a temperature of 575° F. (301.7° C.), a liquid hourly space velocity of 1.0 and a hydrogen circulation rate of 10,000 standard cubic feet per barrel (178. SCM/100 L). The pour point of the product withdrawn from the pour point reduction zone after 396 hours of operation was −67° F. (−55° C.).

EXAMPLE II

In this Example, the criticality of employing a denitrogenation process step is demonstrated. The petroleum distillate feed stock of Example I having a pour point of +25° F. (−3.89° C.) and a nitrogen concentration above 250 parts per million was contacted with the pour point reduction catalyst of Example I which had been prereduced under conditions described in Example I.

The catalyst composition was contacted with the petroleum distillate under pour point reduction conditions comprising a hydrogen partial pressure of 3,000 psig (210 kg/cm²), a temperature of 650° F. (343.3° C.), a liquid hourly space velocity of 1.0 and a hydrogen circulation rate of 10,000 standard cubic feet per barrel (178 standard cubic meters per 100 liters). The pour point of the product withdrawn from the pour point reduction zone was less than −80° F. (−62.22° C.) after 40 hours, −10° F. (−23.33° C.) after 52 hours and +25° F. (−4.44° C.) after 64 hours.

A comparison of the results obtained in this Example with the results obtained by the inventive process described in Example I, demonstrates that with the elimination of the denitrogenation step the pour point reduction catalyst ages rapidly and would be ineffective to reduce the pour point of feed stocks containing greater than 30 parts per million nitrogen.

EXAMPLE III

In this Example the application of the two-step inventive process as applied to the pour point reduction of a medium lubricating oil raffinate is demonstrated. A lubricating oil raffinate boiling between about 650° and 950° F. (343.33° and 510° C.) and containing 108 ppm nitrogen was denitrogenated employing a catalyst comprising 6.0 weight percent nickel and 19.0 weight percent tungsten on alumina. The raffinate was passed through a denitrogenation zone containing the catalyst with the zone being maintained at a hydrogen pressure in the range of 1,000 to 1,500 psig (70 to 105 kg/cm²) and a temperature in the range of 710° to 735° F. (376.7° to 390.5° C.). A liquid hourly space velocity of 1.74 volumes per volume of catalyst per hour was employed to reduce the nitrogen content to less than 4 ppm. A comparison of the properties of the raffinate feed and product are as follows:

TABLE II

| | Feed | | Product | |
|---|---|---|---|---|
| Yield: vol. % | 100.0 | | 99.6 | |
| Gravity: ° API | 28.8 | | 30.7 | |
| Viscosity, SUV: Sec. | | | | |
| 210° F. (98.89° C.) | 49.3 | | 45.8 | |
| Pour Point: ° F. | +100 | (+37.78° C.) | +100 | (+37.78° C.) |
| Nitrogen: ppm | 108 | | <4 | |
| Sulfur: wt. % | 0.21 | | <0.04 | |
| Distillation: ° F | | | | |
| (ASTM 1160) | | | | |
| 10% | 790 | (421.11° C) | 744 | (395.56° C) |
| 50 | 845 | (451.67° C) | 836 | (446.67° C) |
| 90 | 905 | (485° C) | 888 | (475.56° C) |
| End Point | 950 | (510° C) | 940 | (504.44° C) |

The denitrogenated raffinate product was then subjected to a pour point reduction step employing the pour point reduction catalyst of Example I. The catalyst was prereduced in a hydrogen atmosphere at 900° F. (482.22° C.) and sulfided with a mixture of 90 volume percent of hydrogen and 10 volume percent hydrogen sulfide at 550° F. (287° C.). The pour point reduction catalyst was contacted with the denitrogenated raffinate under pour point reduction conditions comprising a hydrogen partial pressure of 1,269 psig (89.3 kg/cm²), a temperature of 615° F. (323.89° C.), a hydrogen circulation rate of 4,275 standard cubic feet per barrel (76.1 standard cubic meters per 100 liters), and a liquid hourly space velocity of 1.1.

A comparison of the properties of the feed and the raffinate product of the pour point reduction step are as follows:

TABLE III

| | Feed | | Dewaxed Raffinate | |
|---|---|---|---|---|
| Yield: vol. % | 100.0 | | 65.5 | |
| Gravity: ° API | 30.7 | | 27.9 | |
| Viscosity, SUV: Sec. | | | | |
| 210° F. (98.89° C.) | 45.8 | | 52.2 | |
| Pour Point: ° F. | +100 | (+37.78° C) | −5 | (−20.56° C) |
| Distillation: ° F | | | | |
| (ASTM D1160) | | | | |
| 10% | 744 | (395.6° C) | 774 | (412.22° C) |
| 50 | 836 | (446.67° C) | 839 | (448.33° C) |
| 90 | 888 | (475.56° C) | 897 | (480.56° C) |
| End Point | 940 | (504.44° C) | 934 | (501.11° C) |

Although the invention has been described with references to specific embodiments, references, and details, various modifications and changes will be apparent to one skilled in the art and are contemplated to be embraced in this invention.

We claim:

1. A pour point reduction process which comprises contacting a petroleum hydrocarbon containing greater than 30 ppm nitrogen and greater than 50 percent by volume of material boiling above 450° F. with a denitrogenation catalyst under denitrogenation conditions, said denitrogenation catalyst comprising at least one hydrogenation component selected from Group VI-B and Group VIII metals on a refractory oxide carrier, recovering a product hydrocarbon from the denitrogenation zone containing less than 30 ppm nitrogen, contacting said product hydrocarbon with a pour point reduction catalyst under pour point reduction conditions, said pour point reduction catalyst comprising a Group IV-B metal, a Group VIII noble metal, and a decationized mordenite support, said pour point reduction conditions comprising a temperature in the range of 450° to 800° F., a liquid hourly space velocity in the range of 0.2 to 10.0, a hydrogen partial pressure in the range of 500 to 5,000 psig, and a hydrogen circulation rate in the range of 500 to 10,000 standard cubic feet per barrel of feed, and recovering therefrom a petroleum hydrocarbon product of reduced pour point.

2. The process of claim 1 wherein said Group IV-B metal comprises titanium.

3. The process of claim 2 wherein said Group VIII noble metal comprises palladium.

4. The process of claim 1 wherein said petroleum hydrocarbon comprises a lube oil fraction boiling in the range of 600° to 1,000° F.

5. The process of claim 4 wherein pour point reduction process conditions are maintained so as to convert less than 35 weight percent of the feed to the pour point reduction zone to a product fraction boiling below the boiling point of the feed.

6. The process of claim 5 wherein the concentration of the Group IV-B metal is in the range of 0.2 to 2.5 weight percent and the concentration of the noble metal is in the range of 0.1 to 2.0 weight percent of the catalyst composite.

* * * * *